Aug. 17, 1943. T. H. BRIGGS ET AL 2,327,013
SCREW THREAD MECHANISM
Filed July 30, 1942    2 Sheets-Sheet 1

Inventors
T.H.Briggs
W.H.Briggs
By Glascock Downing Seibels
Attys

Inventors
T. H. Briggs
W. H. Briggs
By Glascock Downing & Seibold
Attys.

Patented Aug. 17, 1943

2,327,013

UNITED STATES PATENT OFFICE

2,327,013

SCREW THREAD MECHANISM

Thomas Henry Briggs and Walter Henry Briggs, Birmingham, England, assignors to Burman & Sons Limited, Birmingham, England Application July 30, 1942, Serial No. 452,962
In Great Britain July 23, 1941

1 Claim. (Cl. 74—459)

This invention relates in general to screw-thread mechanisms of the kind in which the connection between the helical groove of a shaft and that of a complementary nut is effected by balls occupying and capable of rolling along the said grooves, the object of the invention being to provide an improved construction whereby the circulation of the balls around their path or paths can be effected with a minimum of frictional resistance.

The invention comprises the combination of a shaft formed with a helical groove, a slidable nut member subtending about one half of the shaft, a separate ball-returning member secured to the nut member and subtending the other part of the shaft, and at least one ring of balls surrounding the shaft, the nut member being formed with at least one groove which is complementary to that on the shaft and is such that the nut and shaft are interconnected by the balls lying within these grooves, and the ball-returning member being formed with at least one groove which has its ends situated opposite the ends of the groove in the nut member and is shaped to allow the balls in it to pass around the shaft.

In the accompanying sheets of explanatory drawings.

Figure 1:
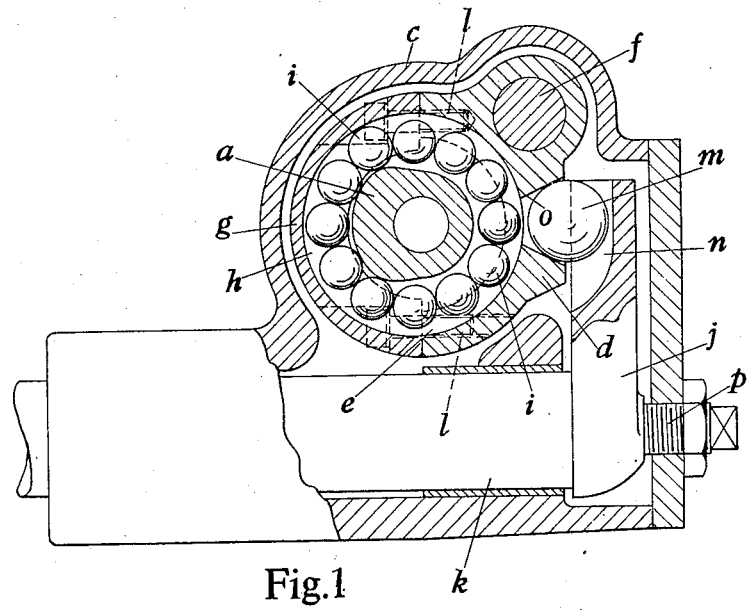
Figures 1 and 2 are respectively a part sectional elevation and a part sectional plan of a screw thread mechanism constructed in accordance with the invention and forming part of a vehicle steering mechanism.
Figure 2:
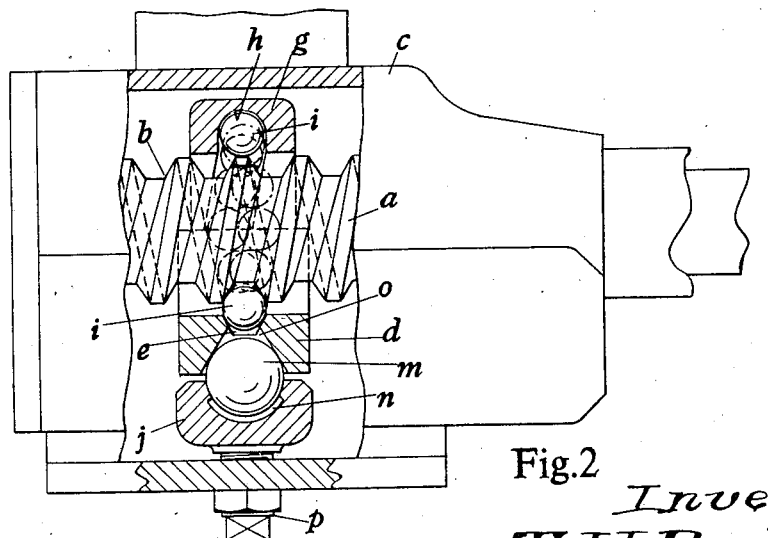

In carrying the invention into effect as shown in Figures 1 and 2, we employ a short shaft $a$ which is formed on or is adapted to be secured to the lower end of the steering shaft, and which has formed in it a deep helical groove $b$ of any convenient length and of truncated V-section. At one side of this shaft $a$ is mounted within any convenient housing $c$ a slidable nut member $d$ which subtends about one half of the shaft. In the semi-circular face of this member $d$ is formed a groove $e$ corresponding in shape to the adjacent portion of the helical groove $b$ on the shaft. In the housing $c$ is secured a cylindrical guide rod $f$ which is arranged parallel with the axis of the shaft $a$, and on which the nut member $d$ can slide.

At the side of the shaft $a$ remote from the nut member $d$ is arranged a part $g$ herein termed the ball-returning member which is secured to the nut member by screws $l$. This member $g$ subtends the part of the shaft $a$ not subtended by the nut member $d$ and is formed with an inclined groove $h$ in the curved surface adjacent to the shaft $a$. The grooves $e$, $h$, accommodate a ring of balls $i$ for effecting the required connection between the shaft $a$ and the nut member $d$.

The groove $h$ in the ball-returning member $g$ has its ends located immediately opposite the ends of the groove $e$ of the nut member $d$. Consequently the groove $h$ crosses over the helix on the shaft $a$, and to enable the balls $i$ to travel along this groove, its depth is made to increase gradually from each end to a maximum at the centre of its length, the maximum depth being such as will allow the balls to pass the outer surface of the shaft.

The ring of balls $i$ is free to circulate in a path formed by the groove $e$ in the nut member $d$, the adjacent part of the helical groove $b$ in the shaft $a$, and the groove $h$ in the ball-returning member $g$. Considering this ball-circulating path, the balls $i$ (which are all in contact with each other) effect connection between the nut member $d$ and shaft $a$ while occupying the nut groove $e$ and the adjacent part of the shaft groove $b$, but on passing from one end of the nut groove they enter the groove $h$ in the ball-returning member $g$ and are returned thereby to the other end of the nut groove. While passing along the groove $h$ in the ball-returning member $g$, the balls $i$ ride over the ridge between adjacent parts of the shaft groove $b$.

It will be seen from the foregoing description that the ring of balls $i$ circulates in an easy path which is free from angles and which consequently involves a minimum of frictional resistance.

A lever $j$ is connected to the nut member $d$ and serves, under the action of this member, to impart angular movement to a shaft $k$ extending from the lever, this shaft being situated at right angles to the grooved shaft $a$, and its motion being transmitted to the steering linkage of the road wheels in the usual manner.

The connection between the lever $j$ and nut member $d$ is effected by a ball $m$ which occupies a longitudinal groove $n$ in the inner face of the lever and a deep recess or a hole $o$ of conical form in the adjacent face of the nut member.

The lever $j$ is held in close contact with the ball $m$ and the latter in close contact with the nut member $d$ by an adjusting screw $p$ arranged coaxially with one end of the lever shaft $k$, the pressure of this screw being transmitted to the lever shaft either directly or through the agency of a thrust piece which may conveniently have the form of a ball. The same pressure also presses the nut member $d$ towards the helically grooved shaft $a$ and so eliminates slackness between the said member and shaft and the intermediate ring of balls $i$.

Figure 3:
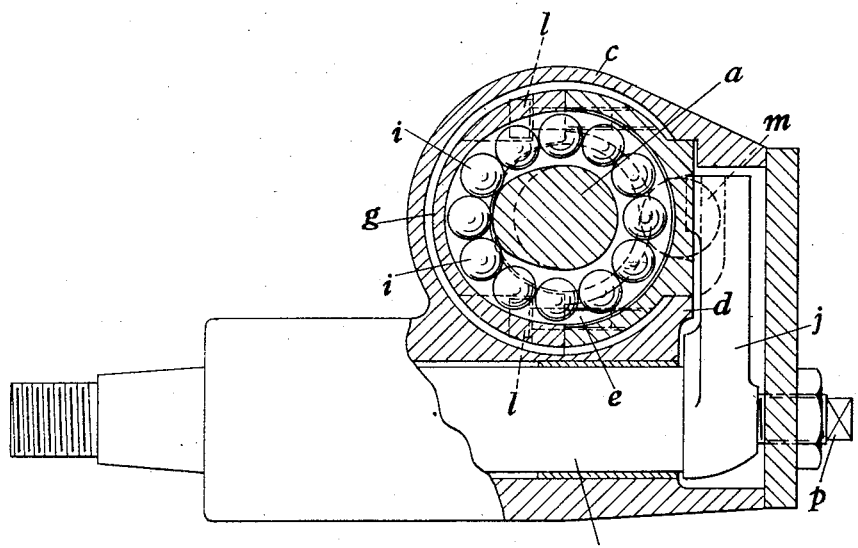
Figures 3 and 4 are respectively similar views to Figures 1 and 2 illustrating a modified form of the invention.
Figure 4:
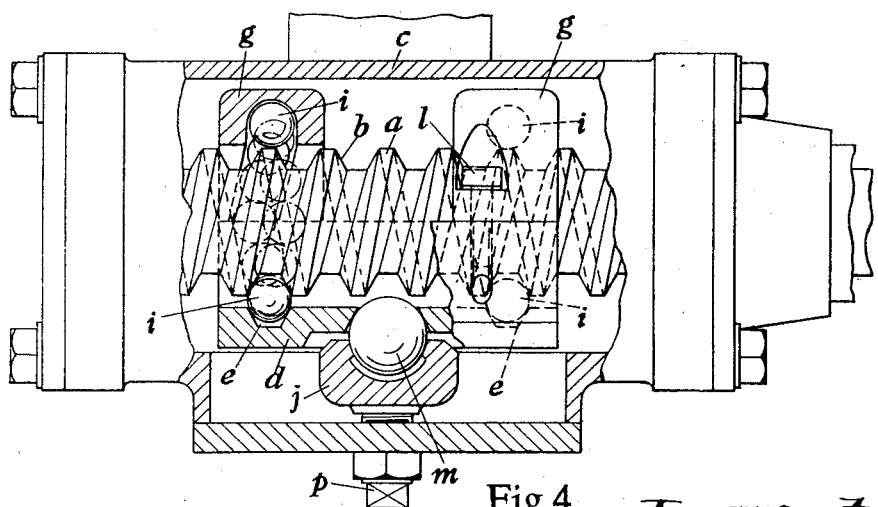

Instead of employing a single ring of balls as above described for interconnecting the grooved shaft $a$ and nut member $d$, we may employ two or more rings of balls as shown for example in Figures 3 and 4. In this example the nut member $d$ is formed with a pair of grooves $e$ corresponding in shape and disposition to the adjacent portions of the helical groove $b$ in the shaft $a$. Also the ball-returning member $g$ comprises a pair of parts which are secured to the nut member $d$ by means of screws $l$, and which are each formed with an inclined groove $h$, the arrangement being such that the ends of these grooves are situated opposite to corresponding ends of the nut grooves $e$ and form with the latter the required circulating paths for the two rings of balls $i$.

The example shown in Figures 3 and 4 is further distinguished from that shown in Figures 1 and 2 by the feature that the housing $c$ is suitably shaped to form a guide for the nut member $d$.

In other respects the example shown in Figures 3 and 4 is similar to that shown in Figures 1 and 2 and is indicated by the same reference characters.

By this invention we are able to employ balls for connecting a grooved nut member to a helically grooved shaft in a very simple and satisfactory manner.

The invention is not limited to the examples above described as subordinate constructional details may be varied. Moreover the invention is applicable to other analogous mechanisms involving a combination of nut and screw.

Having thus described our invention what we claim as new and desire to secure by Letters Patent is:

A screw thread mechanism of the kind specified, comprising the combination of a shaft formed with a helical groove, a slidable nut member subtending about one half of the shaft, a separate ball-returning member secured to the nut member and subtending the other part of the shaft, and at least one ring of balls surrounding the shaft, the nut member being formed with at least one groove which is complementary to that on the shaft and is such that the nut and shaft are interconnected by the balls lying within these grooves, and the ball-returning member being formed with at least one groove which has its ends situated opposite the ends of the groove in the nut member and is shaped to allow the balls in it to pass around the shaft.

THOMAS HENRY BRIGGS.
WALTER HENRY BRIGGS.